A. PELL.
Railroad Signal.
No. 50,382.
Patented Oct. 10, 1865.
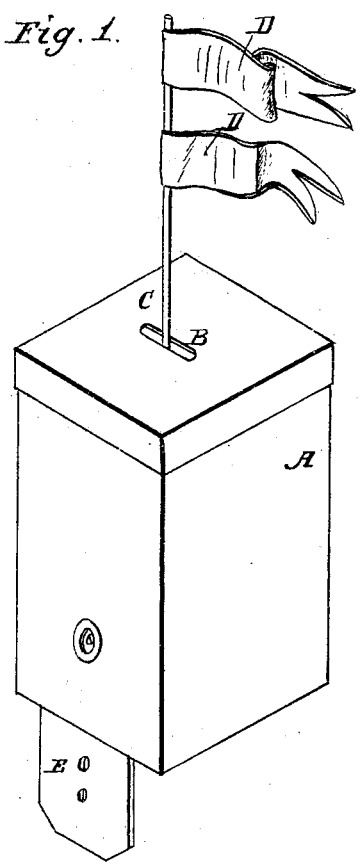
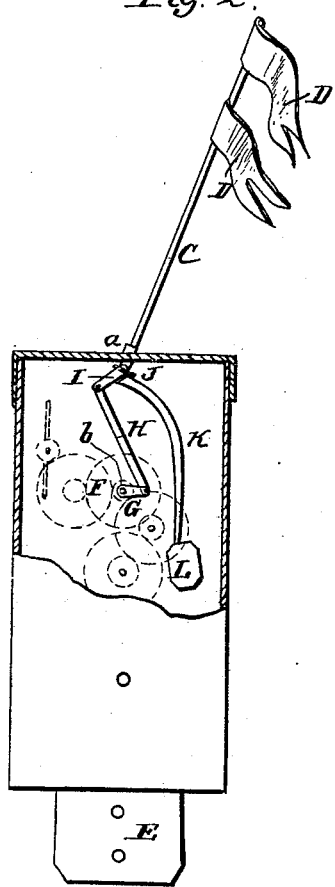
Witnesses.
Inventor,

UNITED STATES PATENT OFFICE.

ALFRED PELL, OF NEW YORK, N. Y.

IMPROVEMENT IN RAILROAD-SIGNALS.

Specification forming part of Letters Patent No. 50,382, dated October 10, 1865.

*To all whom it may concern:*

Be it known that I, ALFRED PELL, of the city, county, and State of New York, have invented a new and useful Improvement in Signals for Railroads and other Purposes; and I do hereby declare that the following is a full, clear, and exact description thereof, which will enable those skilled in the art to make and use the same, reference being had to the accompanying drawings, forming part of this specification, in which—

Figure 1 is an elevation of an apparatus made according to my invention. Fig. 2 is an elevation thereof, with a portion of one of its walls broken away to show the parts which are immediately connected with the staff of the signal.

Similar letters of reference indicate corresponding parts.

The object of my invention is to provide an apparatus for signaling railroad-trains and for other purposes; and it consists in combining a signal or flag with mechanism to keep the signal in motion without requiring attention or labor on the part of the signal-man.

A designates a box, which contains a train of clock-work, (indicated by the letter F.) It can be fixed to any suitable standard or fixture near a switch or railroad-crossing or a bridge or other place of danger by means of the plate E, which projects downward from its under side. Its cover has a slot, B, to allow a signal or flag-staff, C, to vibrate therein.

The staff may be provided with flags or tablets of several different colors, or with a single one of a striking pattern and color, as may be thought best. The staff rests in a socket, $a$, fixed permanently on the upper side of a rock-shaft, J, whose ends are journaled in the upper part of the frame which contains the clock-work.

The rock-shaft is operated from the clock-work by means of a short crank-arm, G, made fast to the arbor $b$ of the last wheel of the train, which crank-arm is connected by a rod, H, to a longer crank, I, on the rock-shaft. The revolution of the crank G will cause the crank I to vibrate, and so rock the shaft J and give a vibratory movement to the flag-staff so long as the machinery continues in motion.

K is a bent arm, attached to the side of the crank I and carrying a weight, L, at its lower end. Its place of attachment to the crank is about midway the ends of the crank, and its office is to overcome the dead-points of the crank G.

It is well known that great importance is attached by railroad-men to the use of signals, and it is common to place indicating tablets or flags at crossings and switches, to indicate to the engine-driver and to the conductor of an approaching train the condition of the track at that point. It is also common to employ a watchman to hold a flag or signal at such points. Instead of these methods I have invented the plan of moving signals and flags at such points, for the reason that they would be more likely to be seen by the driver and conductor than a stationary signal, and I propose to move them by means of a train of clock-work operated by springs or weights or by any other convenient motive power.

It will be necessary for the attendant or watchman to keep the spring of the clock-work wound up, and the apparatus may be arranged so as to be stopped at will and again started at the time of approach of a train.

It is clear that my invention is applicable also in other situations besides on the track of railroads—as, for instance, on lines of frontier country, at military stations, on sea-coasts, and everywhere in situations where signals are addressed to the sight.

I claim as new and desire to secure by Letters Patent—

A signal constructed and operated substantially as described, for railroad or other purposes, so as to be kept in motion by mechanical power.

ALFRED PELL.

Witnesses:
JAMES E. PULSFORD,
ALFRED PELL, Jr.